United States Patent

[11] 3,530,755

| [72] | Inventor | Victor F. Gugler<br>8920 Helen Ave., Sun Valley, California 91352 |
|---|---|---|
| [21] | Appl. No. | 705,136 |
| [22] | Filed | Feb. 13, 1968 |
| [45] | Patented | Sept. 29, 1970 |

[54] APPARATUS FOR CUTTING MATERIAL ADVANCING ALONG A CONVEYOR
10 Claims, 10 Drawing Figs.

[52] U.S. Cl. .................................................. 83/355,
83/168, 83/438, 83/595, 83/640, 83/642
[51] Int. Cl. .............................................. B26d 5/08
[50] Field of Search .......................................... 83/355,
356, 350, 438, 642, 643, 595, 596, 262, 168, 467,
391, 640, 107/(Inquired)

[56] References Cited
UNITED STATES PATENTS

| Re. 4,927 | 6/1872 | | 83/642X |
|---|---|---|---|
| 253,466 | 2/1882 | | 83/643X |
| 2,345,637 | 4/1944 | | 83/355X |
| 2,524,917 | 10/1950 | | 83/642X |
| 2,667,922 | 2/1954 | | 83/642X |
| 2,808,883 | 10/1957 | | 83/642X |
| 3,158,057 | 11/1964 | | 83/355 |
| 3,174,375 | 3/1965 | | 83/642X |
| 3,234,979 | 2/1966 | | 83/643X |

*Primary Examiner*—Frank T. Yost
*Attorney*—Harris, Kiech, Russell and Kern

ABSTRACT: Apparatus for cutting material advancing along a conveyor comprising a cutting blade supported for simultaneous vertical and horizontal movement between upper and lower positions in a plane transverse to direction of movement of the conveyor.

Patented Sept. 29, 1970

INVENTOR
VICTOR F. GUGLER
BY HIS ATTORNEYS
HARRIS, KIECH, RUSSELL & KERN

INVENTOR
VICTOR F. GUGLER
BY HIS ATTORNEYS
HARRIS, KIECH, RUSSELL & KERN

INVENTOR
VICTOR F. GUGLER
BY HIS ATTORNEYS
HARRIS, KIECH, RUSSELL & KERN

INVENTOR
VICTOR F. GUGLER

BY HIS ATTORNEYS
HARRIS, KIECH, RUSSELL & KERN

APPARATUS FOR CUTTING MATERIAL ADVANCING ALONG A CONVEYOR

DISCLOSURE

The present invention relates to improvements in automatic cutting apparatus and, more particularly, to an improved apparatus for cutting articles advancing along a moving conveyor, which apparatus is ideally suited for use in a bakery to repeatedly sever strips of bakery dough into individual sections.

In the mass production of various bakery products such as cinnamon and other breakfast rolls, it is common practice in bakeries today to first form a strip of bakery dough on a moving conveyor belt. As the strip of bakery dough advances with the conveyor belt, the strip is repeatedly severed into sections which upon separation and baking form the individual cinnamon and breakfast rolls.

Possibly, the most common means for severing the strip of bakery dough into sections is the guillotine-type cutter which comprises a cutting blade extending across the top of the moving conveyor belt and mounted for reciprocating vertical movement to repeatedly sever the strip of bakery dough into individual sections. While the guillotine-type cutter is satisfactory for use in severing dough for many bakery products, it is somewhat ineffective in severing bakery dough for cinnamon rolls and other bakery products including raisins, candied fruit, nuts, and similar food objects. In particular, when the cutting blade of a guillotine-type cutter strikes such food objects, it tends to squash or otherwise deform the object rather than cleanly severing it resulting in an uneven or incomplete cut through the strip of bakery dough. For the uneven cut sections, this means that the resulting individual dough items must be either reshaped or the resulting bakery products such as the cinnamon rolls will be deformed. For the incompletely cut sections, this means that additional apparatus or man power must be employed to separate the sections from the dough strip and that the thus separated items must be shaped to produce uniform bakery items. In either case, additional mechanisms and/or man power is required to correct for the inefficient cutting operation of the conventional guillotine-type cutter.

In view of the foregoing, it is an object of the present invention to provide an improved apparatus for severing articles advancing with a moving conveyor.

Another object of the present invention is to provide cutter apparatus for rapidly and cleanly severing strips of bakery dough including raisins, candied fruits, nuts, and the like, as the strips advance on a conveyor.

A further object of the present invention is to provide a cutter apparatus of the foregoing character in which a cutting blade is simultaneously driven in vertical and horizontal directions between upper and lower positions above and in a plane transverse to the direction of movement of the conveyor to repeatedly sever a strip of bakery dough into individual sections as the strip advances with the conveyor.

Still another object of the present invention is to provide improved apparatus of the foregoing character including means for preventing lateral movement of the dough strip as the strip is severed into sections by the cutting blade.

A still further object of the present invention is to provide a cutter apparatus of the foregoing character further including means for directing the cutting blade along one of a number of inclined paths between the upper and lower positions as it is desired to sever bakery dough of different consistency.

The foregoing as well as other objects and advantages of the present invention may be more fully understood by reference to the following description when considered with the drawings which, by way of example only, illustrate certain cutter apparatus embodying the features of the present invention.

Figure 1:
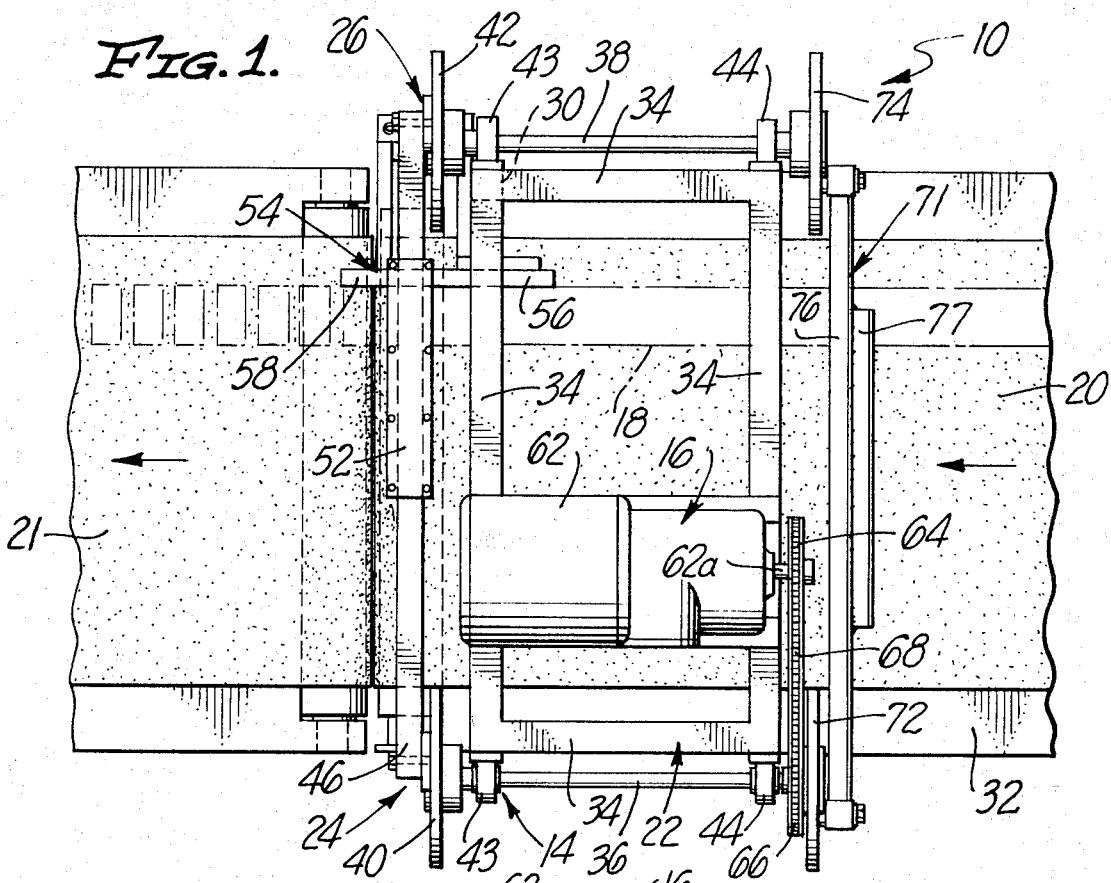
FIG. 1 is a fragmentary top view of one form of cutter apparatus embodying the features of the present invention and mounted over a first conveyor belt for repeatedly severing a strip of dough into individual sections for transport to a second conveyor belt.
Figure 2:
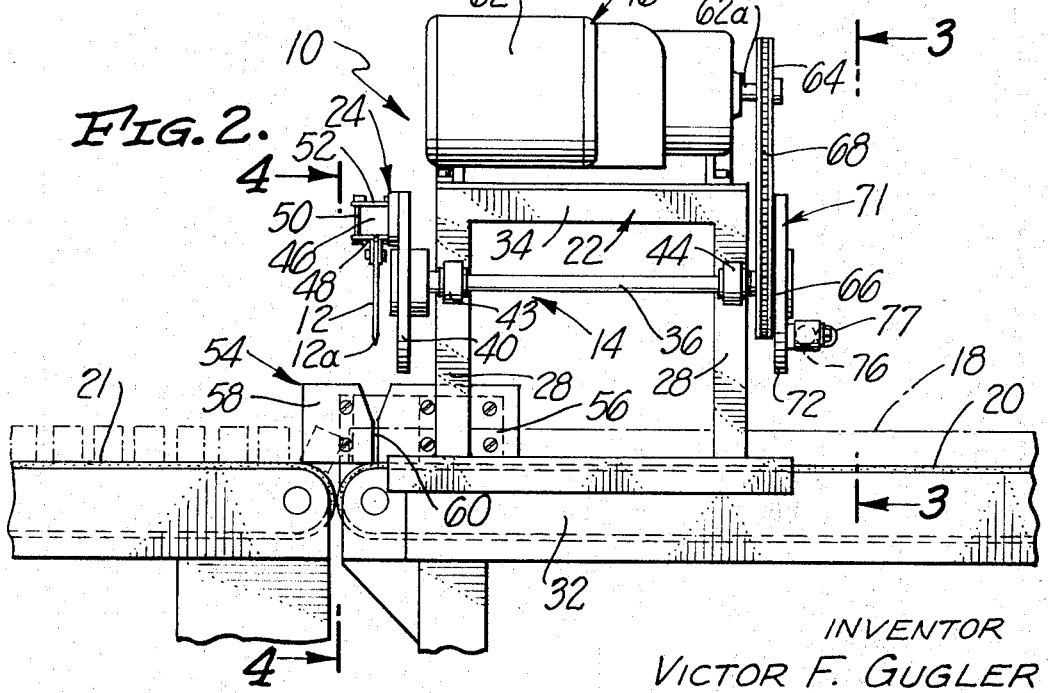
FIG. 2 is a side view of the apparatus illustrated in FIG. 1.
Figure 3:
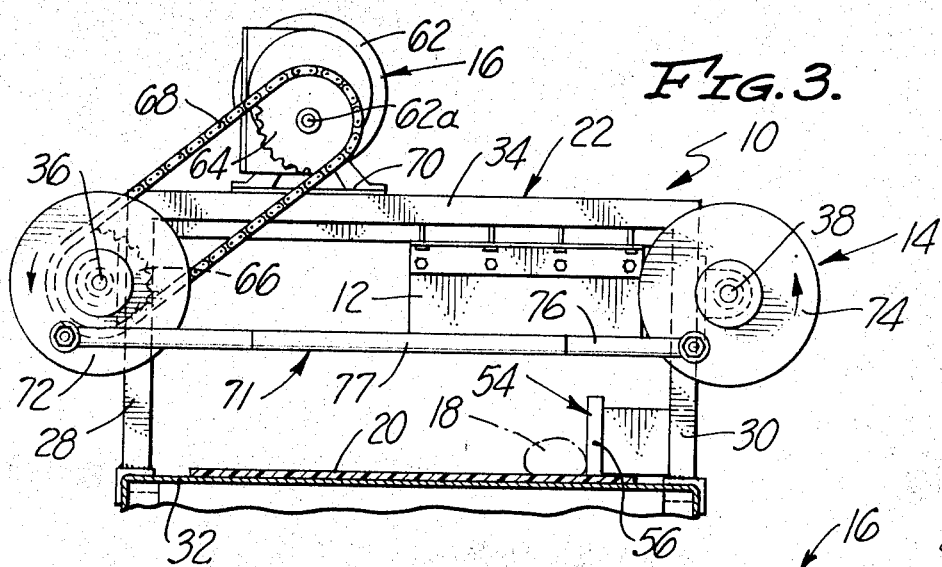
FIG. 3 is a rear view of the apparatus taken along the line 3—3 in FIG. 2.

In the drawings, the apparatus for cutting material advancing along a conveyor is represented generally by the numeral 10 and comprises a cutting blade 12, support means 14 for the cutting blade, and drive means 16 for reciprocating the cutting blade between upper and lower positions to repeatedly sever into sections a strip 18 of material advancing along the top of a conventional continuous conveyor belt 20. The sections formed from the strip 18 move with the conveyor belt 20 onto an adjacent conveyor belt 21 for further processing (see FIGS. 1 and 2).

Generally speaking, the support means 14 is designed to support the cutting blade 12 for simultaneous vertical and horizontal movement between the upper and lower positions in a plane transverse to the direction of movement of the conveyor belt 20 while the drive means 16 is designed to reciprocate the cutting blade between the upper and lower positions along the paths defined by the support means. In this manner, the strip 18 advancing along a conveyor belt is repeatedly severed into sections by simultaneous movement of the cutting blade 12 in vertical and horizontal directions. Such movement of the cutting blade 12 simulates the transverse, inclined hand movement of a knife blade in severing a strip of material and in practice has been found to quickly, cleanly and efficiently sever strips of dough containing raisins, nuts, and other food objects into individual sections for subsequent processing and baking to form cinnamon and other breakfast rolls. In the foregoing manner, the cutting apparatus 10 has been found to overcome the previously referred to drawbacks of the conventional guillotine-type cutter when utilized to sever strips of dough containing food objects.

More particularly, in the illustrated forms of the apparatus 10, the cutting blade 12 is represented as comprising a generally rectangular thin plate of metal having the pointed lower edge 12a for cleanly severing the strip 18 (of bakery dough) into sections as the blade is repeatedly moved through the strip as it advances with the conveyor belt 20.

The means 14 supporting the cutting blade 12 for such reciprocating movement comprises a frame 22 carrying rotary means 24 and 26. The illustrated form of the frame 22 comprises pairs of verticals 28 and 30 on opposite sides of the conveyor belt 20 and extending from a table 32 over which the conveyor belt passes, and connecting members 34 between upper ends of the verticals. The rotary means 24 and 26 carried by the frame 22 support opposite ends of the cutting blade 12 for like and synchronous rotary movement above a top surface of the conveyor belt 20 and to this end comprise like support shafts 36 and 38, radial members 40 and 42, and a connecting rod 46. The support shafts 36 and 38 extend in the direction of the conveyor belt 20 and are journaled front and rear in bearing blocks 43 and 44 connected to the pairs of verticals 28 and 30, respectively, such that the shafts lie parallel to each other and to the conveyor belt and are free to turn about their longitudinal axes. The radial members 40 and 42, here represented as comprising flywheels, are secured to forward ends of the shafts 36 and 38 for turning therewith in a common vertical plane. The connecting rod lies parallel to the top of the conveyor belt and is pivotally secured at opposite ends by pin means to the flywheels 40 and 42 at like points along like radii such that the flywheels turn in synchronism with each other in response to operation of the drive means 16.

In addition to connecting the flywheels 40 and 42, the rod 46 carries the cutting blade 12 such that it extends downwardly over the top of the conveyor belt 20 in a plane transverse to the direction of movement of the belt. In this regard, and in the form of the apparatus illustrated in FIGS. 1–5, the cutting blade 12 is bolted to front and rear bracket plates 48 carried on the bottom of connecting rod 46 by vertical bolts 50 extending through a support plate 52 and running along the top of the rod. In the embodiment illustrated in FIGS. 6 and 7, the top portion of the cutting blade 12 is bolted directly in the connecting rod 46. In both cases, the mounting for the cutting blade 12 on the connecting rod 46 and the connection of the rod to the flywheels 40 and 42 are such that upon a turning of the support shafts 36 and 38, the cutting blade completely severs the strip 18 while the lower edge 12a at most only grazes the top of the conveyor belt 20. Thus, while the operation of the apparatus results in cleanly and completely severed sections from the strip 18, it does not cut or otherwise impair the material forming the conveyor belt.

Figure 4:
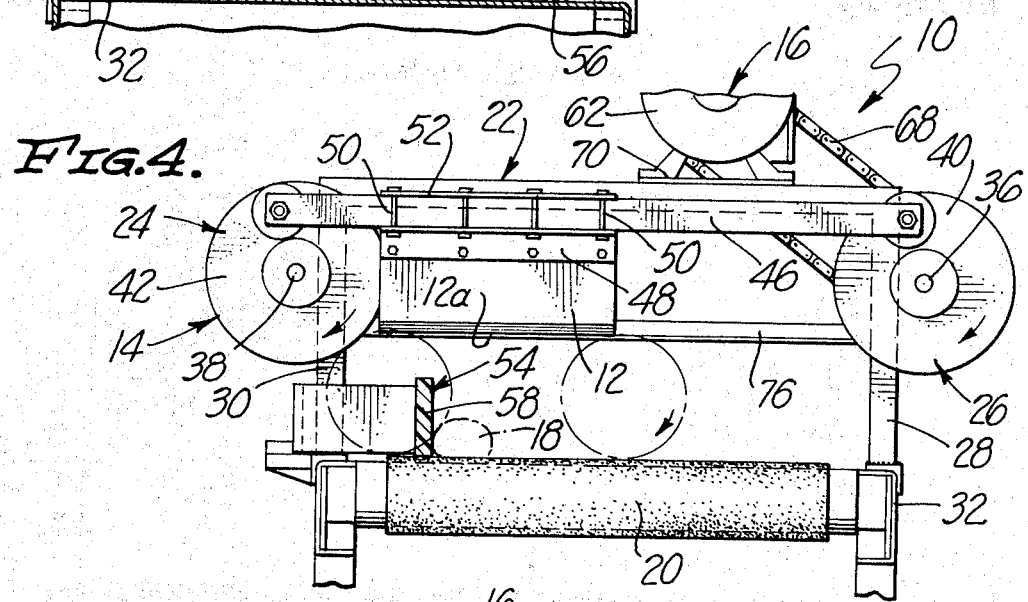
FIG. 4 is a front view of the apparatus taken along the line 4—4 in FIG. 2 with the cutting blade of the apparatus in an upper position.
Figure 5:
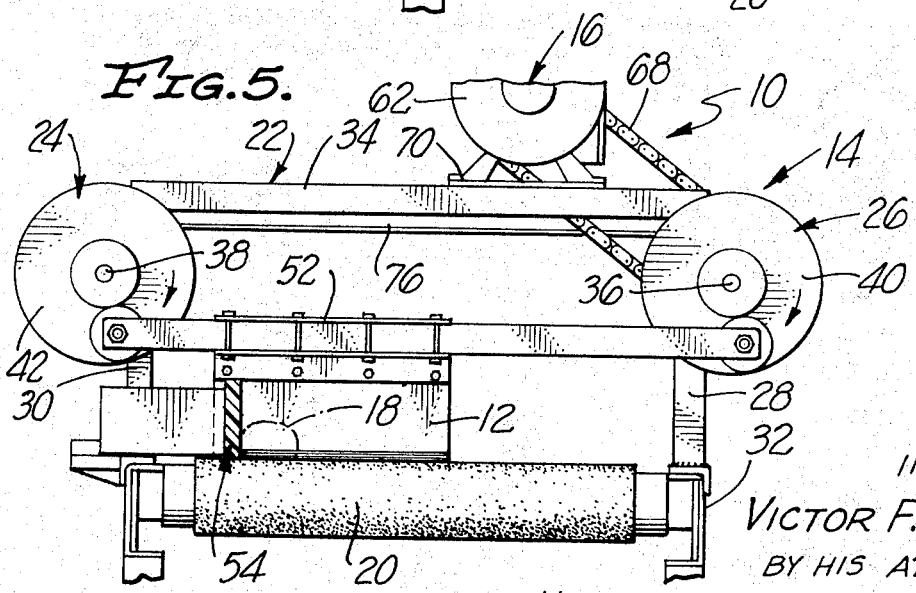
FIG. 5 is a front view similar to FIG. 4 with the cutting blade in a lower position severing the strip of dough into a section.

In the embodiments of the apparatus 10 illustrated in FIGS. 1–7, the paths of movement of opposite corners of the cutting blade 12 are represented in FIG. 4 and comprise circular loops. It is appreciated from such a showing that the cutting blade 12 is supported for simultaneous vertical and horizontal movement between upper (FIG. 4) and lower (FIG. 5) positions in a plane transverse to the direction of movement of the conveyor belt 20. As the lower edge 12a of the cutting blade 12 engages the strip 18 of bakery dough, it therefore moves simultaneously across and downward through the strip to sever a section therefrom. In practice, it has been found that such motion of the cutting blade 12 slices, rather than smashes, raisins, nuts, and other food objects within the dough strip to permit the cutting blade to cleanly and completely sever sections from the dough strip and thereby overcome the disadvantages previously discussed as being associated with conventional guillotine-type cutters when employed for a similar purpose.

It is of course appreciated that as the cutting blade 12 travels through the dough strip 18, the dough strip is urged laterally across the top of the conveyor belt. To limit such lateral movement of the dough strip 18, and to provide means for automatically cleaning the cutting blade 12, the illustrated form of the apparatus 10 comprises a guide means 54 connected to the frame 22 and extending along and over a left side of the conveyor belt 20. Preferably, the guide means 54 comprises a pair of blocks 56 and 58 spaced to define slot 60 therebetween for receiving the cutting blade as it passes in a horizontal direction through the strip 18 from the lower position to the upper position. The slot 60 is dimensioned such that the blade in passing therethrough is wiped clean and the blocks are preferably formed or coated with a nonstick material such as Teflon to prevent dough stickage thereto.

As previously indicated, movement of the cutting blade 12 along paths defined by the support means 14 is under the control of the drive means 16. The drive means may be of a variable speed type and two forms of such drive means are illustrated in the drawings. In the embodiment illustrated in FIGS. 1–5, the drive means comprises a motor 62, a pair of sprockets 64 and 66, and a drive chain 68. The motor 62 is supported on top of a platform 70 connected to the members 34 in the frame 22 while the sprocket 64 is connected to the output shaft 62a of the motor. The sprocket 66 on the other hand, is connected to and supported by the shaft 36 for turning therewith and the drive chain 68 extends over and around the sprockets to turn the shaft in response to operation of the motor 62. Thus, in the apparatus of FIGS. 1–5, the shaft 38 becomes a driven shaft through the connection of the rod 46 to the flywheels 40 and 42.

In operation, it has been found during rotation of the flywheels 40 and 42 that when the connecting rod 46 reaches the plane of the support shafts 36 and 38, there is a tendency for the driven flywheel 42 to reverse its rotation. To insure that such does not occur, the drive means 16 illustrated for the embodiment of FIGS. 1–5 includes a counterbalancing device 71 comprising flywheels 72 and 74 and a connecting rod 76 carrying a counterweight 77. The flywheels 72 and 74 are secured on rear ends of the support shafts 36 and 38 and the connecting rod 76 is pivotally connected at opposite ends by pin means to like points in like radii on the flywheels. The connection points for the rod 76 to the flywheels 72 and 74 are approximately 180° displaced from the connection points for the ends of the rod 46 to the flywheels 40 and 42. It has been found in practice that the counterbalancing device 71 prevents the driven flywheel 42 from reversing during operation of the drive means 16 and insures continuous and efficient operation of the apparatus 10 to repeatedly sever the strip 18 into sections as the strip advances with the conveyor belt 20.

Figure 6:
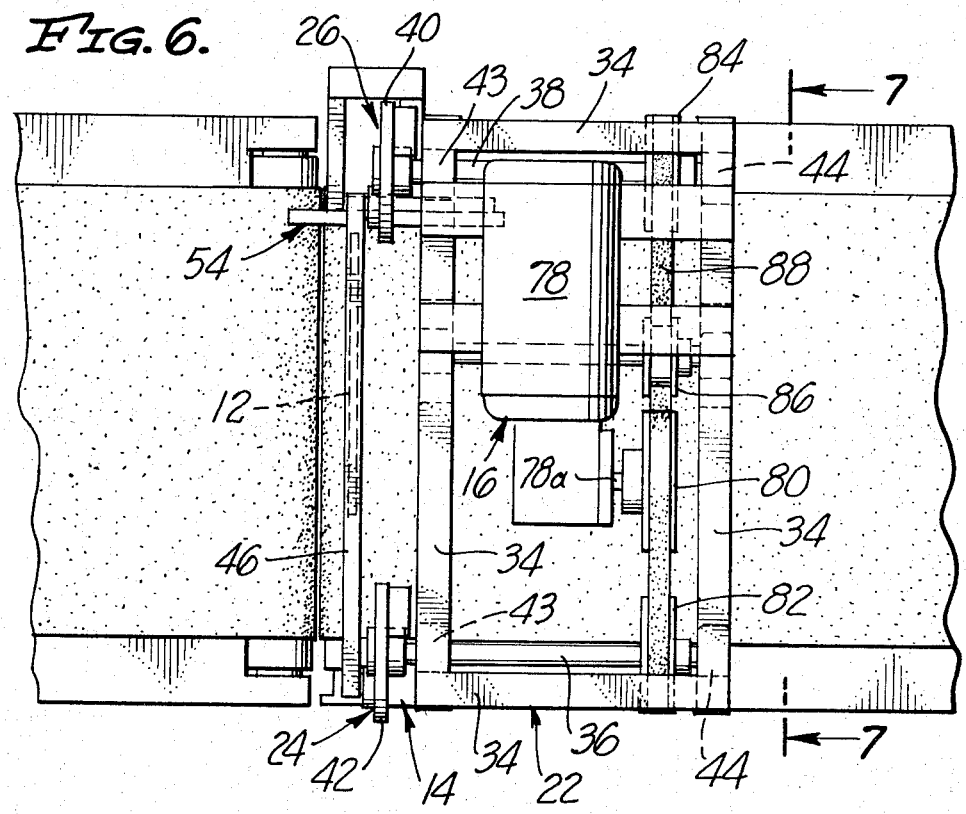
FIG. 6 is a fragmentary top view of a second form of cutter apparatus embodying the features of the present invention.
Figure 7:
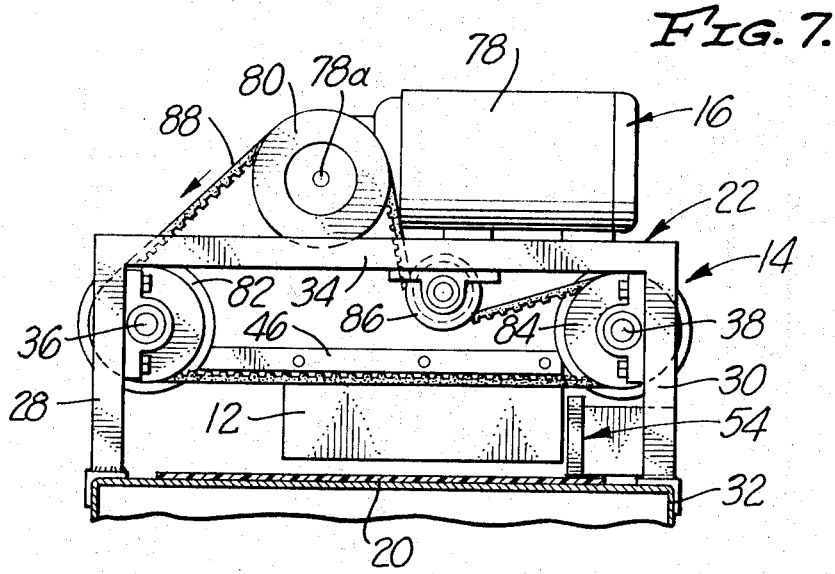
FIG. 7 is a rear view of the apparatus taken along the line 7—7 in FIG. 6.
Figure 8:
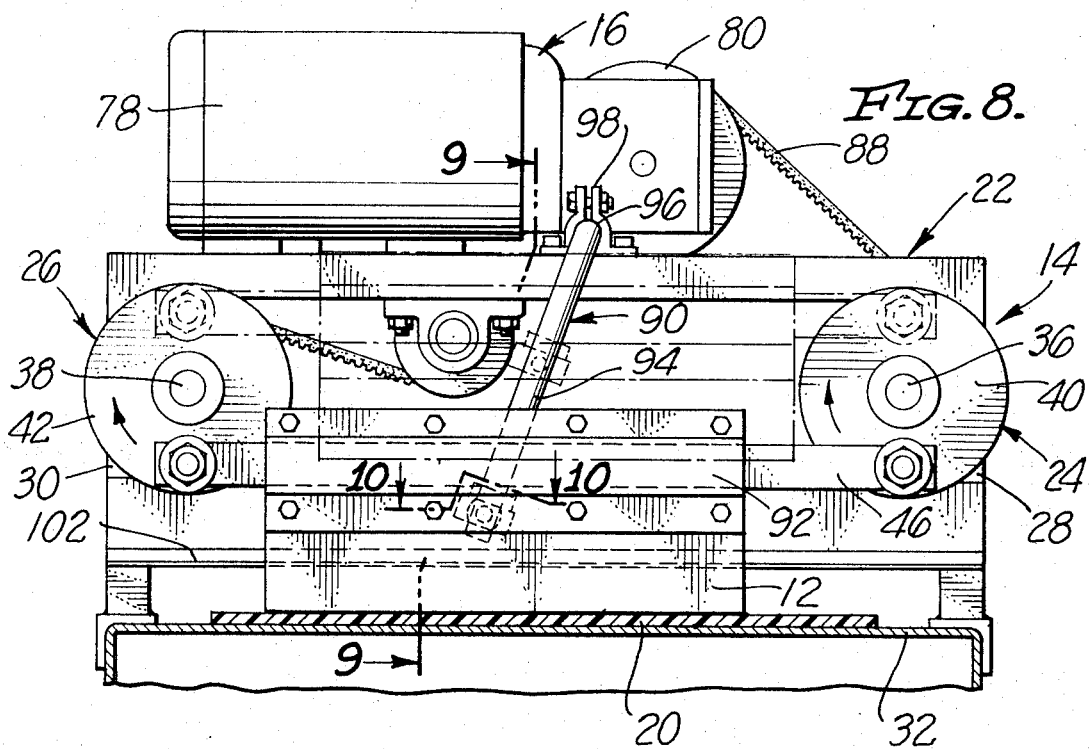
FIG. 8 is a front view of still another form of the cutter apparatus.

An alternate form of the motor drive 16 is illustrated in the embodiments shown in FIGS. 6 and 7 and in FIG. 8. In particular, the drive means 16 there illustrated includes a motor 78, three pullies 80, 82, and 84, a guide roller 86, and a continuous timing belt 88 carrying a series of teeth on its inner surface. The pulley 80 is secured to the output shaft 78a of the motor for turning therewith while the pullies 82 and 84 are mounted on rear ends of the support shafts 36 and 38. The belt 88 is directed over the pullies 80, 82 and 84, which preferably carry a series of teeth for mating with the teeth on the belt to maintain synchronous turning of all pullies with operation of the motor. The roller 86 is connected to the frame 22 and engages the outer surface of the belt 88 to tension the belt over the pullies. Thus arranged, a turning of the output shaft 78a with operation of the motor 78 produces a turning of the pulley 80 and a positive drive of the support shafts 36 and 38 through the pullies 82 and 84. In practice, it has been found that the positive and synchronous drive provided by the drive means 16 of FIG. 6 eliminates the need for the counterbalancing device 71 illustrated in FIGS. 1–5. It is of course appreciated in this regard that a chain drive could be substituted for the belt drive and would operate in a similar manner.

Figure 9:
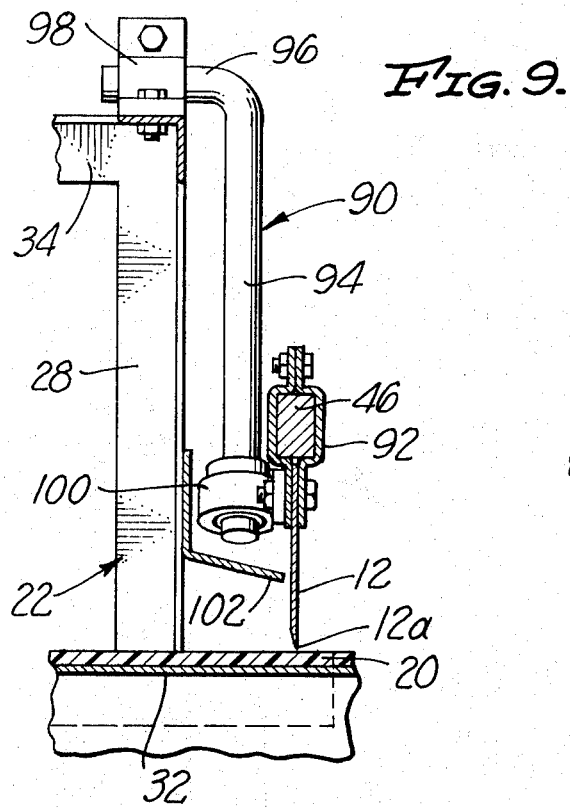
FIG. 9 is a fragmentary sectional view taken along the line 9—9 in FIG. 8.
Figure 10:
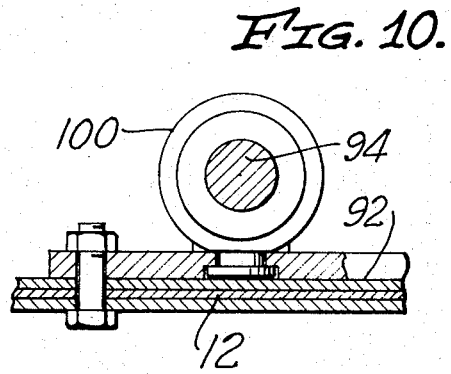
FIG. 10 is a fragmentary sectional view taken along the line 10—10 in FIG. 8.

As previously indicated, the drive means 16 for the embodiment illustrated in FIGS. 8–10 is the same as that employed in the embodiment illustrated in FIGS. 6 and 7. The embodiment of FIG. 8, however, differs from that of FIG. 7 in that means 90 are included for directing the cutting blade 12 along an inclined path between the upper and lower positions and preferably such means are adjustable such that the angle of the incline may be set at a value which permits cutting of a strip with maximum efficiency. Such control is highly desirable when the cutter apparatus 10 is called upon to sever strips of different consistency or different composition.

To provide for such control over the direction of movement of the cutting blade 12 and to provide means for selectively adjusting the angle of movement of the cutting blade between upper and lower positions, the apparatus illustrated in FIG. 8 includes a sleeve 92 supporting the cutting blade 12 for axial sliding movement along the connecting rod 46 between the flywheels 40 and 42. Behind the cutting blade 12 is stationed a vertically extending guide means here represented as being a rod 94 having a bent upper end 96 supported for turning in a clamp 98 to permit manual swinging movement of the rod in a vertical plane. Pivotally secured to the back of the sleeve 92 is a collar 100 receiving the rod 94.

Since the cutting blade 12 is free to slide along the connecting rod 46, as the flywheels turn in response to operation of the drive means 16, the collar 100 rides up and down the rod 94 to control the path of movement of the cutting blade between upper and lower positions. While the rod 94 is inclined, the motion of the cutting blade 12 is simultaneously in horizontal and vertical directions to provide the previously referred to highly efficient severing of a strip into individual sections even when the strip includes raisins, nuts, and other food products.

By swinging the rod 94 in the clamp 98, the angle of the path of movement for the cutting blade 12 may be selectively controlled to maximize the efficiency of the cutting blade in severing strips of different consistency. In fact, by swinging the rod to a vertical position, the cutting blade may be caused to move in a vertical direction to act as a guillotine-type cutter.

As the cutting blade 12 moves between the upper and lower positions the rear surface thereof is wiped free of dough by a wiper blade 102 connected to the frame 22 and extending along the rear surface of the cutting blade. Thus, the cutting blade 12 is maintained clear of dough which might otherwise interfere with the efficient operation of the apparatus in cleanly and completely severing a dough strip into individual sections.

From the foregoing descriptions, it is appreciated that the present invention provides an improved cutter apparatus for severing strips of material advancing along a conveyor belt and which when applied to the severing of dough strips is capable of completely and cleanly severing the strips into individual sections despite the presence of raisins, nuts, and other food items which heretofore have interfered with the proper operation of guillotine-type cutters.

While particular forms of apparatus have been described in some detail herein changes and modifications may be made therein without departing from the spirit of the invention. Moreover, while the illustrated apparatus has been described as cutting dough strips, the apparatus may be usefully employed to cut various other materials of different consistency advancing along a conveyor. It is therefore intended that the present invention be limited in scope only by the terms of the following claims.

I claim:

1. Apparatus for cutting material advancing along a conveyor comprising:
   a cutting blade;
   support means supporting said cutting blade for simultaneous vertical and horizontal movement between upper and lower positions above and in a plane transverse to the direction of movement of said conveyor, said support means including guide means for directing said cutting blade along an inclined path between said upper and lower positions and said guide means including adjustment means for adjusting the angle of said inclined path relative to said conveyor; and
   drive means connected to said support means for reciprocating said cutting blade between said upper and lower positions to repeatedly sever materials advancing along said conveyor.

2. Apparatus for cutting material advancing along a conveyor comprising:
   a cutting blade;
   support means supporting said cutting blade for simultaneous vertical and horizontal movement between upper and lower positions above and in a plane transverse to the direction of movement of said conveyor, said support means comprising rotary means supporting opposite ends of said cutting blade for like and synchronous rotary movement above a top surface of said conveyor; and
   drive means connected to said support means for reciprocating said cutting blade between said upper and lower positions to repeatedly sever materials advancing along said conveyor.

3. The apparatus of claim 2 further comprising guide means extending along the top of and in the direction of movement of said conveyor for limiting transverse movement of said material as it is severed by said cutting blade.

4. The apparatus of claim 3 wherein said guide means comprises a vertically extending guide block having a slot therethrough for receiving said cutting blade as it moves horizontally through said material.

5. The apparatus of claim 2 wherein:
   said rotary means comprises first and second support shafts spaced from and parallel to each other and to said top of said conveyor and extending in the direction of said conveyor, first and second radial means on and extending radially from said first and second support shafts, and blade carrying means pivotally connected to said first and second radial means at like points on like radii; and
   said drive means includes means for turning at least one of said first and second shafts.

6. The apparatus of claim 5 wherein said drive means comprises a drive motor and means extending from said motor to said first and second shafts for turning said shafts in synchronism.

7. The apparatus of claim 5 wherein said blade carrying means comprises a connecting rod pivotally connected at opposite ends to said first and second radial means and carrying said blade means above said top of said conveyor.

8. The apparatus of claim 7 wherein:
   said first and second radial means comprise first and second flywheels on front ends of said first and second shafts; and
   said apparatus further comprises third and fourth flywheels on rear ends of said first and second shafts for turning therewith, a counter balancing connecting rod between said third and fourth flywheels, and means pivotally connecting opposite ends of said counter balancing connecting rod to said third and fourth flywheels at like points along like radii, said radii being substantially 180° displaced from the radii along which said ends of the first mentioned connecting rod are connected to said first and second flywheels.

9. The apparatus of claim 7 further comprising:
   means supporting said cutting blade for sliding movement along said connecting rod;
   a vertically extending guide means above said conveyor; and
   means on said cutting blade for riding on said guide means to guide said cutting blade up and down along said guide means as said first and second radial means rotate with said first and second shafts.

10. The apparatus of claim 9 comprising means for adjusting the angle of said vertically extending guide means relative to said conveyor.